(12) United States Patent
van der Made

(10) Patent No.: US 7,900,258 B2
(45) Date of Patent: *Mar. 1, 2011

(54) COMPUTER IMMUNE SYSTEM AND METHOD FOR DETECTING UNWANTED CODE IN A P-CODE OR PARTIALLY COMPILED NATIVE-CODE PROGRAM EXECUTING WITHIN A VIRTUAL MACHINE

(75) Inventor: Peter A. J. van der Made, Newport Beach (AU)

(73) Assignee: International Business Machines Corporation, Armonk, NY (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/072,295

(22) Filed: Feb. 25, 2008

(65) Prior Publication Data

US 2008/0320595 A1 Dec. 25, 2008

Related U.S. Application Data

(63) Continuation of application No. 10/145,592, filed on May 13, 2002, now Pat. No. 7,370,360.

(51) Int. Cl.
G06F 11/00 (2006.01)

(52) U.S. Cl. .................. 726/24; 717/134; 717/135; 713/187; 726/26

(58) Field of Classification Search ............ 726/24, 726/26; 717/135, 134; 703/22; 713/187, 713/188
See application file for complete search history.

(56) References Cited

U.S. PATENT DOCUMENTS

| 7,093,239 B1 * | 8/2006 | van der Made | 717/135 |
| 7,366,299 B2 * | 4/2008 | Cheung | 380/28 |
| 7,370,360 B2 * | 5/2008 | van der Made | 726/24 |
| 7,657,419 B2 * | 2/2010 | van der Made | 703/22 |
| 2002/0162015 A1 * | 10/2002 | Tang | 713/200 |

* cited by examiner

Primary Examiner—Kimyen Vu
Assistant Examiner—April Y Shan
(74) Attorney, Agent, or Firm—King & Spalding LLC; Arthur J. Samodovitz

(57) ABSTRACT

An automated analysis system identifies the presence of malicious P-code or N-code programs in a manner that limits the possibility of the malicious code infecting a target computer. The target computer system initializes an analytical virtual P-code engine (AVPE). As initialized, the AVPE comprises software simulating the functionality of a P-code or intermediate language engine as well as machine language facilities simulating the P-code library routines that allow the execution of N-code programs. The AVPE executes a target program so that the target program does not interact with the target computer. The AVPE analyzes the behavior of the target program to identify occurrence of malicious code behavior and to indicate in a behavior pattern the occurrence of malicious code behavior. The AVPE is terminated at the end of the analysis process, thereby removing from the computer system the copy of the target program that was contained within the AVPE.

25 Claims, 8 Drawing Sheets

COMPUTER IMMUNE SYSTEM AND METHOD FOR DETECTING UNWANTED CODE IN A P-CODE OR PARTIALLY COMPILED NATIVE-CODE PROGRAM EXECUTING WITHIN A VIRTUAL MACHINE

STATEMENT REGARDING PRIORITY AND RELATED APPLICATIONS

This application is a continuation of and claims priority to application Ser. No. 10/145,592 filed May 13, 2002 now U.S. Pat. No. 7,370,360, entitled "Computer Immune System and Method for Detecting Unwanted Code in a P-Code or Partially Compiled Native-Code Program Executing Within a Virtual Machine," the entire contents of which are incorporated by reference.

BACKGROUND OF THE INVENTION

1. Field of the Invention

The present invention relates to the field of computer security and specifically to the analysis of P-code and partially compiled computer programs of the type that execute within a run-time virtual environment, and more specifically to the detection of such programs that exhibit malicious or self-propagating behavior including computer viruses, network worms and Trojans.

2. Discussion of the Related Art

Detection of malicious programs has been a concern throughout the era of the personal computer. With the growth of communication networks such as the Internet and increasing interchange of data, including the rapid growth in the use of e-mail for communications, the infection of computers through communications or file exchange is an increasingly significant consideration. Infections take various forms, but are typically related to computer viruses, Internet or other network worms, Trojan programs or other forms of malicious code. Recent incidents of e-mail mediated attacks have been dramatic both for the speed of propagation and for the extent of damage, with Internet service providers (ISPs) and companies suffering service problems and a loss of e-mail capability. In many instances, attempts to adequately prevent file exchange or e-mail mediated infections significantly inconvenience computer users. Improved strategies for detecting and dealing with virus attacks are desired.

One conventional technique for detecting computer viruses (including Internet worms and Trojans) is signature scanning. Signature scanning systems use sample code patterns extracted from known malicious code and scan for the occurrence of these patterns in other program code. In some cases program code that is scanned is first decrypted through emulation, and the resulting code is scanned for signatures or function signatures (footprints). A primary limitation of this signature scanning method is that only known malicious code is detected, that is, only code that matches the stored sample signatures of known malicious code is identified as being infected. All viruses or malicious code not previously identified and all viruses or malicious code created after the last update to the signature database will not be detected. Thus, newly created viruses are not detected by this method; neither is malicious code in which the signature, previously extracted and contained in the signature database, has been overwritten.

In addition, the signature analysis technique fails to identify the presence of a virus if the signature is not aligned in the code in the expected fashion. Alternately, the authors of a virus may obscure the identity of the virus by opcode substitution or by inserting dummy or random code into virus functions. Nonsense code can be inserted that alters the signature of the virus to a sufficient extent as to be undetectable by a signature-scanning program, without diminishing the ability of the virus to propagate and deliver its payload. In addition, signature scanning fails where malicious programs have similar code structure to benign application programs. In such a case, the signature scanner will generate large numbers of false positives, or fail to detect the malicious code if the signature is abandoned.

An example of the signature scanner technique generating large numbers of false positives involves the analysis of malicious or potentially malicious code produced by a compiler that produces P-code or N-code. P-code or pseudocode is compiled and executable within a virtual machine environment. P-code is used in such languages as Java and is compiled to a form that is executable within an appropriate virtual machine in a host computer. N-code is partially compiled native code that requires a run-time environment for execution. Both P-code and N-code are executable within a virtual machine environment and the event procedures constructed by these compilers have a high degree of similarity whether the code is malicious or ordinary. Consequently, signature scanning tends to identify a large number of false positives for P-code and N-code programs.

Another virus detection strategy is integrity checking. Integrity checking systems extract a code sample from known, benign application program code. The code sample is stored, together with information from the program file such as the executable program header and the file length, as well as the date and time of the sample. The program file is checked at regular intervals against this database to ensure that the program file has not been modified. Integrity checking programs generate long lists of modified files when a user upgrades the operating system of the computer or installs or upgrades application software. A major disadvantage of an integrity check based virus detection system is that a great many warnings of virus activity issue when any modification of an application program is performed. It is difficult for a user to determine when a warning represents a legitimate attack on the computer system. Another drawback of the integrity checking method is that malicious code must modify other files to be detectable and the method therefore only works with computer viruses, not other forms of malicious code such as Internet worms and Trojan programs which do not alter other program files. Yet another disadvantage of the integrity checking method is that the virus has to be activated on the target system, that is, running in memory and performing its infection function on the target computer's files in order to be detectable, since changes to files only occur after the virus is activated.

Checksum monitoring systems detect viruses by generating a cyclic redundancy check (CRC) value for each program file. Modification of the program file changes the CRC value for that file and it is that change that indicates infection of the program file. Checksum monitors improve on integrity check systems in that it is more difficult for malicious code to defeat the monitoring. On the other hand, checksum monitors exhibit the same limitations as integrity checking in that the method generates many false positives.

Behavior interception systems detect virus activity by interacting with the operating system of the target computer and monitoring for potentially malicious behavior. When such malicious behavior is detected, the action is blocked and the user is informed that a potentially dangerous action is about to take place. The potentially malicious code can be allowed to perform this action by the user. This makes the behavior interception system somewhat unreliable, because the effectiveness of the system depends on user input. In addition, resident behavior interception systems are sometimes detected and disabled by malicious code.

Another conventional strategy for detecting infections is the use of bait files. This strategy is typically used in combination with other virus detection strategies to detect an existing and active infection. This means that the malicious code is presently running on the target computer and is modifying files. The virus is detected when the bait file is modified. Many viruses are aware of bait files and do not modify files that are either too small, obviously a bait file because of their structure or that have a predetermined content in the file name.

Another virus detection method is known as sand-boxing. This method is based on the fact that normal programs interact with the operating system through a set of predefined entry points referred to as API calls (application program interface calls). The API calls are made to procedures located in memory whose entry points are maintained by the operating system and stored in an API table. Such an API table is present in each program space created under the operating system. In the sand-boxing method, the API table is replaced (in the program's process space only) with an API table that consists of pointers to the anti-virus protection shell which then monitors each API call before passing the call to the real operating system API address. This method also has the drawback that the malicious code has to be activated on the target computer's platform before detection can take place. Another drawback of this method is that it works only for those programs that employ the documented manner of calling the system's API's. Many programs containing malicious code, including viruses, Internet worms and Trojans do not follow the standard convention and directly call the operating system at an address determined by scanning the operating system memory for an export table contained within the kernel 32 and other standard system DLLs. Such programs are capable of immediately infecting the target computer during the sandbox examination process.

It is apparent that improved techniques for detecting viruses and other malicious types of code are desirable.

SUMMARY OF THE PREFERRED EMBODIMENTS

An aspect of the present invention provides a method for identifying the presence of malicious code in program code within a computer system. The method includes initializing an analytical virtual P-code engine (AVPE) within the computer system. P-code is virtual machine code, whereby a run-time engine is required to interpret the P-code for execution. The run-time engine translates each P-code to one or more instructions in machine code. The AVPE comprises software simulating functionality of a P-code interpreter and exposes a set of library routines for N-code compiled programs, where a virtual central processing unit and virtual memory perform the actual processing. A target program is virtually executed within the AVPE so that the target program interacts with the computer system only through the AVPE and the virtual central processing unit. The behavior of the target program is analyzed following virtual execution to identify occurrence of malicious code behavior and indicating in a behavior pattern the occurrence of malicious code behavior. The AVPE is terminated after the analyzing process, thereby removing from the computer system a copy of the target program that was contained within the AVPE, including the de-allocation of all virtual memory resources containing data or program statements created by the virtualized program.

According to some implementations of this aspect, the method may deallocate all virtual memory resources containing data or program statements created by the target program.

In some other implementations of this aspect, library routines for N-code compiled programs are exposed to the AVPE through an application program interface.

In still other implementations of this aspect, P-code is virtual machine code and a run-time engine simulates the operations performed by each P-code. Another aspect of the present invention provides a method for identifying the presence of malicious code in program code within a computer system. A virtual engine is initialized within the computer system. The virtual engine comprises software simulating functionality of a central processing unit, a P-code interpreter, memory and an operating system including application program interface (API) calls to the virtual operating system and a set of API calls to the P-code engine library routines. A target program is virtually executed within the virtual engine so that the target program interacts with the virtual operating system and the virtual central processing unit through the virtual engine. The behavior of the target program is monitored during virtual execution to identify presence of malicious code and to indicate in a behavior pattern the occurrence of malicious code behavior. The virtual engine is terminated, leaving behind a record of the behavior pattern characteristic of the analyzed target program.

Still another aspect of the present invention provides a method for identifying the presence of malicious code. An analytical virtual P-code engine (AVPE) is initialized. The AVPE simulates the functionality of a P-code interpreter, the AVPE interacting with a virtual central processing unit that provides processing and virtual memory management functions. The method virtually executes a target program within the AVPE so that the target program interacts with the host computer system only through the AVPE and the virtual central processing unit. The AVPE triggers behavior bits to identify the occurrence of all I/O actions present in the program, generating a behavior pattern. The AVPE terminates and thereby removes from the host computer system a copy of the target program that was contained within the AVPE.

DETAILED DESCRIPTION OF THE PREFERRED EMBODIMENTS

Figure 1:
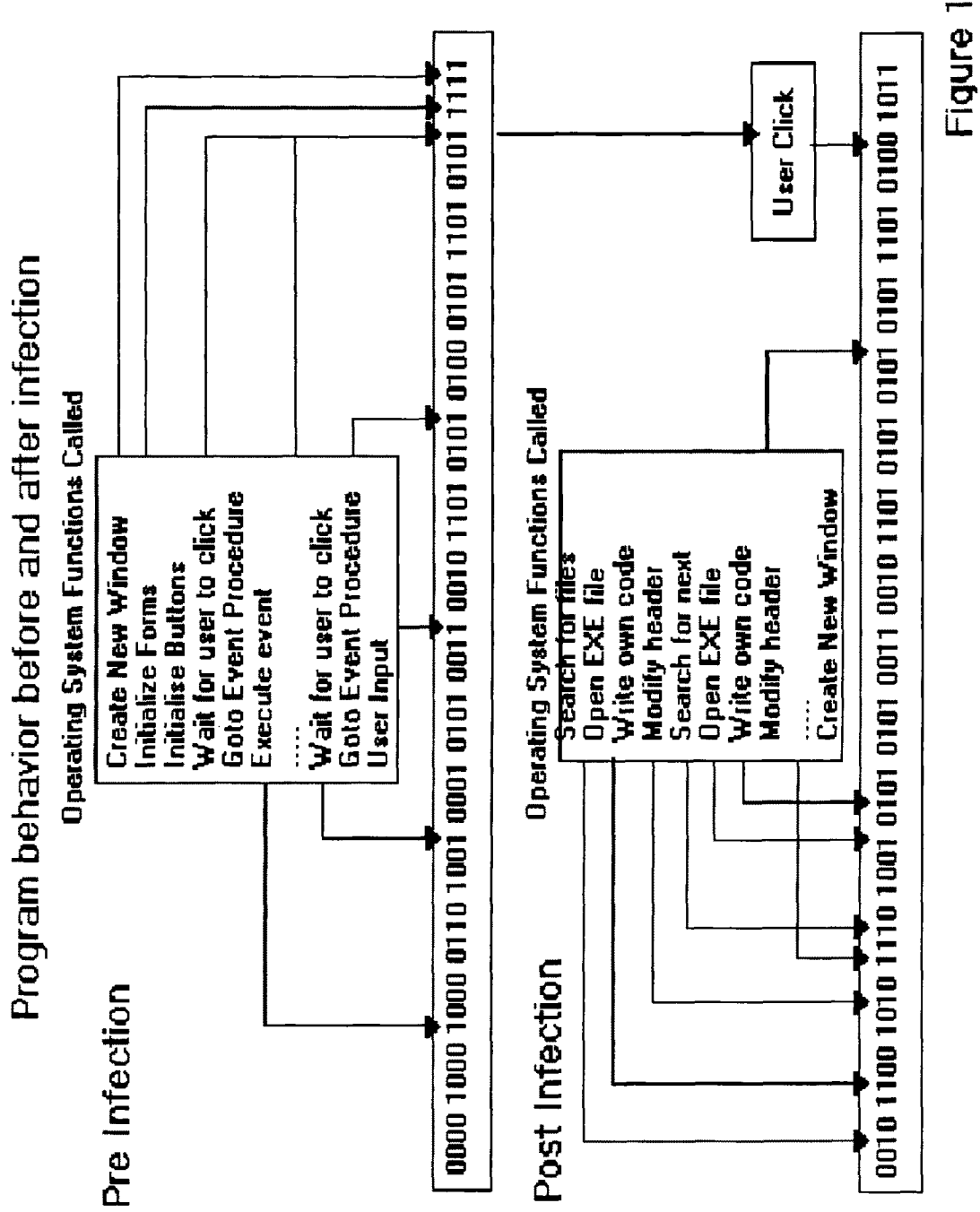
FIG. 1 illustrates behavior patterns generated according to the analytical behavior method, showing an observed behavior pattern for code that is not infected and another behavior pattern for code that is infected with a computer virus.

Significant aspects of this description relate to N-code programs and program code compiled within a computer system to an intermediate language generally referred to as P-code. P-code is virtual machine code, whereby a run-time engine is required to interpret the P-code for execution. The run-time engine simulates the operations performed by each P-code. Preferred embodiments of the present invention provide a method or apparatus for identifying the presence of malicious P-code or N-code programs in a manner that preferably limits the possibility of the malicious code infecting the target computer. Particularly preferred embodiments initialize an analytical virtual P-code engine (AVPE) within the target computer system. N-code is defined as native executable code, which requires the presence of a P-code engine to execute. The N-code is executed by accessing library routines within the P-code engine though a set of application program interface (API) calls. A number of commercial compilers generate such N-code executable programs. The produced code will not function unless the P-code engine for that language is present on the target computer platform. It is consequently particularly preferred that the initialized AVPE comprises software that simulates the functionality of a P-code or intermediate language engine and memory as well as machine language facilities that simulate the P-code (API) library routines that allow the execution of N-code programs.

Most preferably the AVPE executes a P-code target program so that the target program interacts only with the AVPE. Alternately, an N-code program may interact only with the AVPE and a virtual processing unit. The analytic behavior method analyzes the behavior of the target program following virtual execution to identify occurrence of malicious code behavior and indicate in a behavior pattern the occurrence of malicious code behavior. In preferred embodiments the behavior pattern is stored in a behavior data structure and the behavior observed in the program is recorded as a sequence of symbols representative of the observed behaviors. Particularly preferred embodiments of the present invention provide a behavior description language for more accurate characterization of the observed behavior. The AVPE preferably is terminated at the end of the analysis process, thereby removing from the computer system a copy of the target program that was contained within the AVPE.

Other embodiments of the present invention might provide a method for identifying the presence of malicious code in N-code or P-code program code within a computer system. A preferred method includes initializing an analytical virtual P-code engine (AVPE) within the computer system, where the AVPE includes software simulating functionality of a P-code or intermediate language engine, memory and an operating system including API calls to the virtual operating system. A target program execution is simulated within the AVPE so that the target program interacts with the virtual operating system through the AVPE. Behavior of the target program is monitored during virtual execution to identify presence of malicious code and the occurrence of malicious code behavior is indicated in a behavior description pattern. The AVPE is terminated, leaving behind a record of the behavior pattern characteristic of the analyzed target program.

A particularly preferred embodiment of the present invention provides an automated analysis system that detects viruses and other types of malicious code within a computer system by generating and subsequently analyzing a behavior pattern for each computer program introduced to the computer system. New or modified computer programs are analyzed before being executed by the computer system. Most preferably the computer system initiates an AVPE representing a simulation of the computer system and the AVPE executes the new or modified computer program to generate a behavior pattern prior to the new computer program being executed by the physical computer system. An analysis is performed on the behavior pattern to identify infected programs upon initial presentation of the program to the computer system.

The preferred behavior description language implementation of the behavior pattern stores data associated with each action undertaken by the unknown program. Analysis takes place by evaluating a set of actions, the data and the sequence in which these actions have been executed. For instance, an action of writing a data file with data indicates a legitimate operation. A write action to a system file, which inserts code into such a system file and most particularly when the new program writes its own code into the system file, may indicate an infection of the system file. If such an action is followed by the new program patching the system file header to modify the program's entry point then the malicious infection of a system file is considered as confirmed. This analysis takes place outside the AVPE and, in the presently contemplated implementation is not considered part of the AVPE. This allows the analysis of potentially malicious code to be conducted outside the AVPE environment and so would not be subject to interference from the potentially malicious code.

A variety of different terms are used in programming to describe different functional programming subunits. At different times and for different programming languages subunits of various sorts have been called applets, servlets, objects, functions, routines, subprograms, subroutines and other names. Such designations and the context or differences they represent are not significant to the present discussion and so this discussion is made simply in terms of programs, intending the term program to refer to functional programming units of any size that are sufficient to perform a defined task within a computer system or computing environment.

For convenience and brevity, this discussion references viruses in the known sense of that term as being a self-propagating program generally undesired in the infected computer system. In general, the term 'virus' covers all types of malicious code. Trojans are sometimes referenced separately and are referenced in the known sense of an application program that contains hidden within the body of that program a malicious subroutine or a payload that may cause damage to other software, hardware or information stored within the hardware of the computer system or its peripheral equipment. Trojans may or may not replicate automatically, and may be passed on by human interaction as joke programs or games. Similarly, "worms" are also sometimes discussed separately and sometimes within the overall description of a virus. The term "worm" refers to a program that replicates across a network connection set up between computer systems and infects computer systems connected to such a network by inserting itself within the set of programs that comprise the operating system of that computer system or the programs that are started during the initialization of the operating system. As used here, the term Windows is intended to reference any of the personal desktop operating systems sold by the Microsoft Corporation under the Windows brand name. The term PC or personal computer is used, unless specifically modified to indicate otherwise, to indicate a computer system based on the well-known x86 architecture, including those machines that presently are based on microprocessors sold by Intel Corporation under its Pentium brand name and successors to that microprocessor and architecture. This discussion is provided to illustrate implementation of aspects of the invention. Aspects of the present invention find application in a range of different computer systems in addition to the illustrated personal computer systems.

The present inventor has analyzed the behavior of a variety of different viruses and other malignant code including P-code of the type associated with Visual Basic and including N-code programs. Certain general characteristics of viruses have been identified. A virus needs to infect other programs and eventually other computers to propagate. Worms generally replicate over network connections by scanning the network for open connections, or though the email system. Worms and Trojans generally contain payloads. The payload allows the Trojan or worm to affect the infected system or communicate its presence. A payload might be, for example, a tool that monitors Internet traffic and keyboard entries to spy on passwords and mail those passwords to an anonymous email address or a malicious function that damages the infected computer, for example by corrupting or erasing the data on the hard disk or by altering or disabling the BIOS within the BIOS flash or EEPROM.

These behaviors are characteristic of a virus and are not, in the aggregate, characteristic of other, non-malignant programs. Consequently, a program can be identified as a virus or infected with a virus if it possesses certain ones of these behaviors, certain collections of these behaviors or all of these behaviors. In preferred embodiments of the present invention, the occurrence of these behaviors or combinations of the behaviors is indicated by collections of bits in a behavior pattern data set representing behavior characteristic of the infected program. An example of bit-based behavior patterns for a normal and an infected file are illustrated in FIG. 1.

FIG. 1 illustrates a behavior pattern generated according to the analytical behavior method, showing the behavior pattern for code that is not infected (above) and for code that is infected with a computer virus (below). Both of the illustrated behavior patterns are derived by virtually executing the respective uninfected and infected programs within an AVPE (P-code) and a virtual central processing unit (N-code). Corresponding portions of the uninfected and infected codes are illustrated along with corresponding portions of a behavior pattern for each program. The behavior pattern is, in the illustrated embodiment, a bit pattern where each bit may be a flag indicating an action. The total stream of bits is a value indicative of the behavior of the program observed over the virtual execution of the program. The illustrated behavior patterns are generated through the virtual execution of the respective programs within the analytical virtual P-code engine. In some embodiments of the invention, the sequence in which the flags are set is recorded to provide further description and characterization within the behavior pattern. In alternate and presently preferred embodiments the behavior pattern is an array of symbols or objects from a behavior description language including the order in which the behavior description language are generated and a sample of the data that was manipulated. This much richer data structure provides far greater flexibility and information for analyzing the behavior of programs introduced into the computer system.

In the illustration of FIG. 1 the virus has added a sequence of actions to the functionality of the original program that are atypical of normal program actions and are characteristic of malicious code. The change in program actions is clearly indicated in the behavior patterns for the respective pre- and post-infection programs. For example, in the behavior pattern for the uninfected program there is a bit corresponding to a user click, i.e., the program requires a user to respond to a message by performing a mouse click and the occurrence of that click is recorded by a true flag or one valued bit. In the infected program there is no longer a prompt for user input and the flag in the behavior pattern is false or a zero valued bit, reflecting the fact that there was no prompt for user input and no mouse click recorded.

In preferred embodiments of the present invention, the behavior of newly loaded or called P-code programs is determined in an analytical virtual P-code engine (AVPE) that simulates in software a complete PC, or a sufficiently complete PC, and it is that virtual PC that generates the behavior pattern for later analysis within an analysis module. In some implementations the AVPE may include a virtual central processing unit and in other implementations the AVPE may cooperate with a virtual central processing unit. Generally the virtual PC includes both the AVPE and the virtual central processing unit to simulate the execution of N-code programs. The virtual PC simulates execution of the new or modified program, simulating a range of system functions, and the virtual PC monitors the behavior of the suspect program and makes a record of this behavior that can be analyzed to determine whether the target program exhibits virus or malignant behaviors. The result of the virtual execution by the AVPE is a behavior pattern representative of the program. As discussed in greater detail below, the behavior pattern generated by the virtual PC identifies that a program is infected with a virus or is itself a virus.

An advantage for the use of virtual execution and analysis of new programs for viruses is that the AVPE is virtual and so, if the virtualized new program contains a virus, only the totally isolated AVPE environment is infected. The infected instance of the AVPE most preferably is deleted after the simulation, so the infection is ineffective and the virus does not propagate. Most preferably the virtual CPU, whether within the AVPE or associated with the AVPE, is also deleted so that infection of the virtual CPU is also ineffective. Preferably after the analyzing process the system deallocates all virtual memory resources containing data or program statements created by the virtualized program. The behavior pattern survives the deletion of the AVPE, allowing an analysis program to identify the existence of the virus and of the infection within the new program.

Most preferably, each time a new program is analyzed a new instance of the AVPE is generated, free of modification by any previously virtualized programs including any earlier analyzed viruses. The new program then is run on the new instance of the AVPE preferably followed by initiation of a modified interrupt caller procedure, as described in greater detail below. While the AVPE is executing the new program, the AVPE preferably monitors all decryption loops, operating system calls, DPMI/DOS interrupts and I/O port read/write (r/w) operations, setting bits in the behavior pattern register according to the observed behaviors. It is these bits in the behavior pattern that are retained after the simulation is complete and the virtual PC has been terminated. The bits stored in the behavior pattern register are the behavior pattern and subsequent analysis indicates whether the virtually executed program includes behaviors indicative of the presence of a virus or other malignant code. In other presently preferred implementations, the behaviors are recorded in a more descriptive, object-oriented behavior description language.

The modified interrupt caller procedure calls interrupts that the program being analyzed has modified within the virtual PC and generates a behavior pattern for each of those interrupt service routines as well. This allows particularly preferred embodiments of the present invention to identify certain types of viruses that initially modify only the interrupt service routines and do not begin propagating until the modified interrupt or interrupts are called by another program. By allowing the various interrupt service routines in the AVPE to be modified and then analyzing the modified interrupts, these embodiments of the invention can detect this delayed propagation mechanism. The same is true for viruses that plant a program within the computer's file system and modify the operating system registry to begin execution of that program after the next time the computer is restarted. Programs created by the program in this manner will spawn another virtual PC containing the newly created program. The newly created program will be virtualized in the usual manner, as described in the ABM (analytical behavior method) application, but the behavior pattern preferably is stored as a 'child' of the 'parent' behavior pattern representing the first program. The ABM is described in U.S. patent application Ser. No. 09/642,625, filed Aug. 18, 2000 and entitled "Computer Immune System and Method for Detecting Unwanted Code in a Computer System," which application is incorporated by reference in its entirety.

In some embodiments, only the static, final version of the behavior pattern is analyzed. It is possible, and in many circumstances desirable, to monitor the sequence in which the bits in the behavior pattern register are set. The order in which the behavior pattern bits are set provides additional information allowing identification of additional virus behaviors. Tracking of the order in which the behavior pattern bits are set is accomplished within the AVPE. Further information can be recorded using a more complex behavior data structure and a behavior description language that can more precisely identify behaviors that occur.

Preferred implementations of the analytical behavior method (ABM) proceed by extracting a behavior pattern and sequence from a modified, new, unknown or suspect program, for example using an instance of the AVPE. The behavior pattern is preferably used to analyze the behavior of the unknown program to determine if the behavior of the unknown program is malicious. Identification of malicious behavior in this manner allows identification of virus carrying files prior to infection of the host computer system. The behavior pattern can also be stored in a database and the AVPE can subsequently analyze the behavior of the program following modification to determine if its functionality has been modified in a suspect (malicious) manner. This provides post-infection analysis.

The described analytical behavior method differs from conventional virus detection methods in that it does not match program code to a set of stored patterns as do signature scanners and integrity checkers. Rather, an AVPE is used to generate a behavior pattern and, in particularly preferred embodiments, a sequence of flags within that behavior pattern or a sequence of behavior patterns. The generated behavior pattern does not change significantly between program version updates, but does change dramatically when a virus infects a program. For example, a word processor will still behave like a word processor when the program is replaced or updated with a new version of the program but the word processor changes significantly when the word processor is infected with a virus. The differences reflected in the behavior patterns are illustrated in FIG. 1. When a word processor is infected with a file infector computer virus, the word processor now opens executable files and inserts the viral code into them, thereby infecting additional files. This is clearly reflected in the illustrated behavior patterns.

In particularly preferred embodiments of the invention, the analysis procedure specifically targets infection methods such as, but not limited to, the insertion of code into other executables or documents, submitting code to other applications to be transmitted or stored, insertion of code into high memory blocks and the modification of memory control blocks. Preferred implementations of the analysis method further look for destructive content, such as, but not limited to, functions that overwrite disk areas or the BIOS ROM, delete files or directories, modify data files or submit data to be transmitted. Most preferably, the analysis makes an exception and does not identify as infected a program whose other behavior characteristics indicate that the program is a development tool or software debugging tool and where the modifying behavior is an integral part of the tool's normal function. A viral infection of a development tool can be detected where an expressed function is not part of the tool's normal function, that is, within the development process. Both active (1) and inactive (0) flags present in the behavior pattern may be significant in this analysis, as well as the sequence in which actions take place (i.e., the order in which flag values are changed).

In accordance with preferred embodiments of the present invention, the AVPE or virtual PC represents a simulation of a complete computer system. A complete computer system preferably includes an emulated central processing unit (CPU), emulated memory, input/output (I/O) ports, BIOS firmware, operating system and the operating system data areas, as well as high level engines such as the AVPE and other language emulators. This stands in contrast to the simple emulation of a processor, in which only the processor processes are emulated. In emulation, program instructions are converted from their native form to a stream of instructions that perform the same function on a different hardware platform. Some signature scanning software employs emulation to decrypt the body of a suspect program before the suspect program is scanned for signatures. In virtualization, the entire computer is simulated including operating system calls, which are not actually executed but seem to the calling program to perform the desired functions and return the correct values as if they were executed.

As discussed above, the virtual PC includes a CPU, memory, I/O ports, a program loader, and the operating system application program interface (API) entry points, high level language engines and interface. Using such a complete virtual PC is particularly preferred because it gives the analytical behavior method a high level of control over the virtualized program, including over the sophisticated direct calls to the operating system API. Operating system memory areas and the IAT (import address table) preferably are simulated within the virtual PC and contain address pointers at procedures within the simulated operating system. The virtualized program most preferably is not given access to any of the facilities of the physical machine, thereby avoiding the risk that a potential virus or other malicious code escapes from the controlled environment to infect the host computer system.

Figure 2:
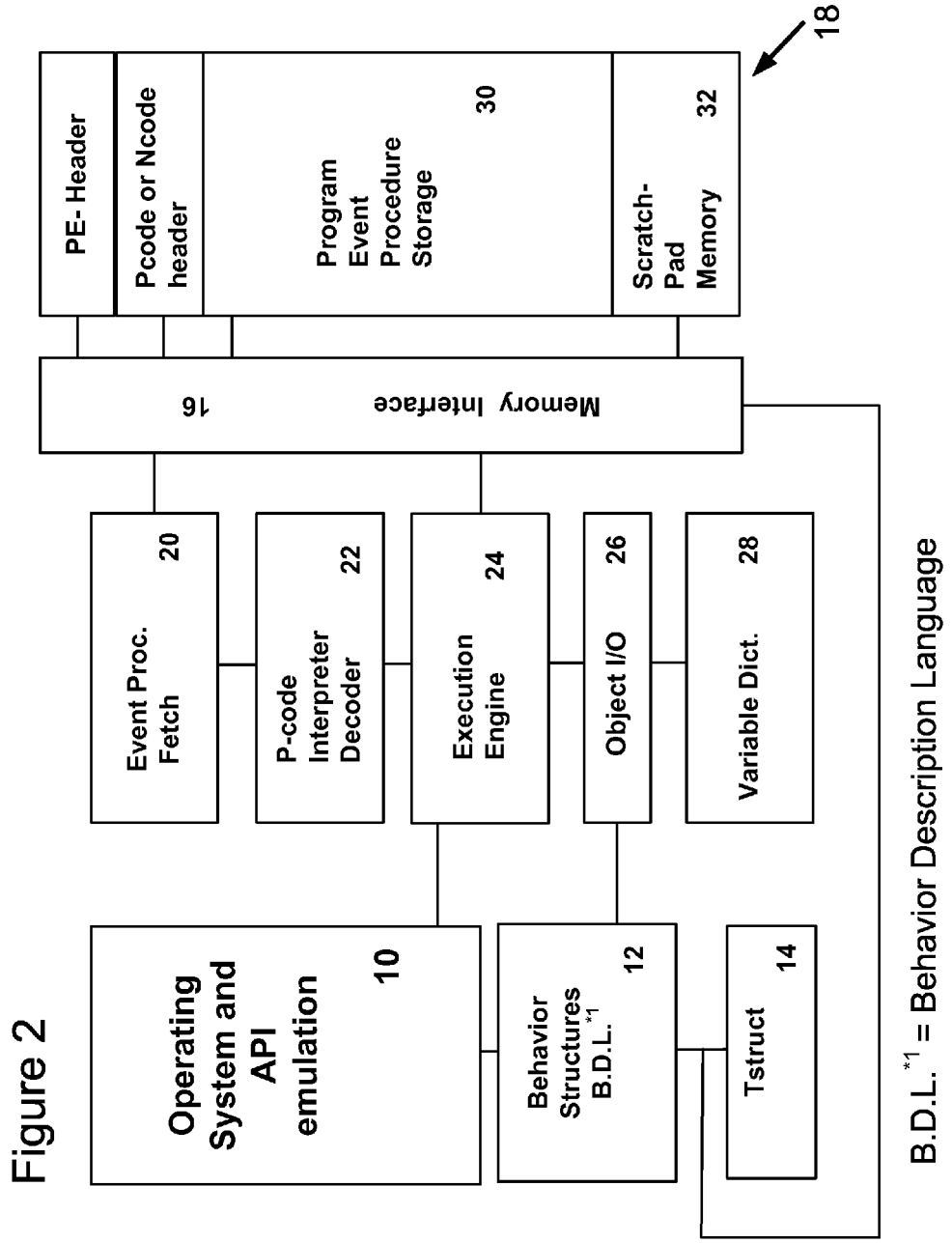
FIG. 2 is a schematic block diagram illustrating aspects of a preferred architecture implementing aspects of the analytical detection method.

FIG. 2 shows a block diagram of components used in a preferred implementation of the analytical detection method. The illustrated AVPE engine preferably fetches P-codes and executes each P-code in a virtual environment. The execution engine exists in the form of library routines that simulate the actions of the physical P-code engine. Similarly, N-code programs call functions within the P-code engine using the emulated operating system API (virtual machine operating system or VMOS) and the software CPU emulation to simulate the actions performed by the program while monitoring those actions, and build a behavior structure representative of those actions.

On the left-hand side of FIG. 2 are several components that are shared between the AVPE and the virtual CPU, including an emulation block 10 that simulates the operating system (VMOS) and application program interface (API). VMOS is the virtualization of the operating system and simulates the actual operating system. Use of the VMOS rather than the actual operating system avoids corruption or infection of the actual operating system. VMOS incorporates simulated memory areas, the IAT and a virtual file system. The analysis module of the behavior analysis program performs an analysis according to behavior previously seen in viral programs, which behavior was stored during the virtual execution of the program in the Tstruct class 12. Tstruct 12 is a class that forms part of the kernel superstructure that ties all of the components together and coordinates execution of the virtual machine. The unshaded components illustrated on the center and right hand side of FIG. 2 are portions of a P-code engine implemented in accordance with a preferred embodiment of an AVPE according to the present invention. Most aspects of the illustrated virtual P-code engine are familiar aspects of commonly used P-code engines and so are described only in summary fashion here. Additional information regarding P-code, P-code engines and their operation and implementation can be found in U.S. Pat. No. 5,590,331 to Lewis, et al., issued Dec. 31, 1996 and entitled "Method and Apparatus for Generating Platform-Standard Object Files Containing Machine-Independent Code," which patent is incorporated by reference in its entirety. Additional information can be found at the following URLS:

http://support.microsoft.com/support/kb/articles/Q229/4/15.ASP http://msdn.microsoft.com/archive/default.asp?url=/archive/en-us/dnarvc/html/msdn_c7pcode2.asp The kernel superstructure allocates the memory for the virtual PC including the virtual AVPE. Memory interface 16 represents the memory management interface to the virtual memory 18. When initiated, the AVPE allocates memory to be used as virtual memory, with additional memory being allocated as needed in blocks (or pages) of approximately 4 KB each. Generally the AVPE is a state machine running in a multi-threaded manner.

Typical programs include an initialization routine and a number of event procedures that are triggered by external actions. The virtual P-code engine includes an event procedure fetcher 20 that fetches the event procedures used by the program. Each event procedure preferably includes P-code or N-code instructions and is associated with a button or form action, such as a button click of a form load action. A preprocessor identifies the event procedures used by the program, including the entry point and the event associated with each of the event procedures, and the AVPE executes each of the event procedures used by the program to analyze the behaviors of those event procedures and hence of the P-code program. Declared variables are stored within the variable dictionary 28. The virtual P-code engine includes P-code interpreter and decoder 22 that accesses the P-codes required by the event procedures and decodes those P-codes. The decoded P-codes are virtually executed by the execution engine 24, which implements procedures simulating the execution procedures for executing the decoded P-codes. The functions for the illustrated P-code engine components are virtually executed and so do not produce actual events within the computer. Thus, if the P-code indicates that a box should be created and displayed, the function will be simulated within the code but no box will be displayed. The parameters of that box are stored within the simulated operating system so that the box can be referenced further on in the program.

Viruses including worms might access the API according to conventional schemes or may instead create an object that in turn makes an API call. Thus, it is preferred that the AVPE include an object I/O handler 26 to simulate object handling. When the target program calls an object, the AVPE preferably accesses a real version of the called object and virtualizes that object, which is then used by the AVPE to simulate the object call. This will not always be necessary or desirable, as emulations of the called object may exist and such an emulation is preferably used when it exists.

The virtual memory 18 stores the P-code program in the manner illustrated in FIG. 2, assuming that the P-code program is stored within a PE shell (PE=portable executable, based on the COFF or common object file format as described at, for example, the URL http://www.delorie.com/djgpp/doc/coff/). The PE file header stores the entry point of the program. The entry point of P-code and N-code program contains the following statements:

Push 00400789

Call MSVBVM60::ThunMain

The value following the PUSH instruction points to a location in the program that contains tables. The tables define the event procedures, forms and resources within the program. The tables also define whether the stored program is a P-code or N-code program. Following the header is storage 30 for the event procedures that are called by the program and a scratch pad memory 32 used by the execution engine. As discussed, all of this is virtual memory is accessed through the interface 16.

The analytical behavior method preferably includes: (1) file structure extraction; (2) change detection; (3) virtualization; (4) analysis; and (5) decision.

Before a program can be virtualized, the file format containing the target program preferably is evaluated. N-code or P-code compiled programs may reside in a PE-file format 'container,' an NE-file format 'container' or an executable 'container' that is in a propriety format. These formats are summarized below. The entry point code is extracted and loaded into the virtual computer's memory at the correct simulated offset. In a physical computer this function would be performed by the program loader function, as part of the operating system and the intermediate language virtual machine.

Windows 3.0 executables NE-type executable which contains both the DOS MZ-header pointing at a DOS code area and a New Executable (NE) header containing the entry point of the Windows (protected mode) code. NE files are segmented.

32-bit executables PE-type executable which contains both the DOS MZ-header and DOS code area and the Portable Executable header containing the entry point and file offset of the protected mode code. PE files are segmented.

Propriety format executable A binary file image that is loaded by the AVM.

The AVM virtual computer loader function and the virtual computer P-code engine preferably are capable of dealing with the file formats and binary image files shown above. The loader function is performed by virtualizing the operating system program loader and so varies depending on the operating system used in the host computer. The file structure analysis procedure looks in the file header and file structure to determine the file format, rather than using the file extension because file extensions are unreliable in general use. The .EXE formats described above therefore include DLL, AX, OCX and other executable file format extensions. The NE/PE/LE executable file formats are similar in complexity;

these file formats use a segment or page table. The PE file format is based on the COFF file specification.

Figure 3:
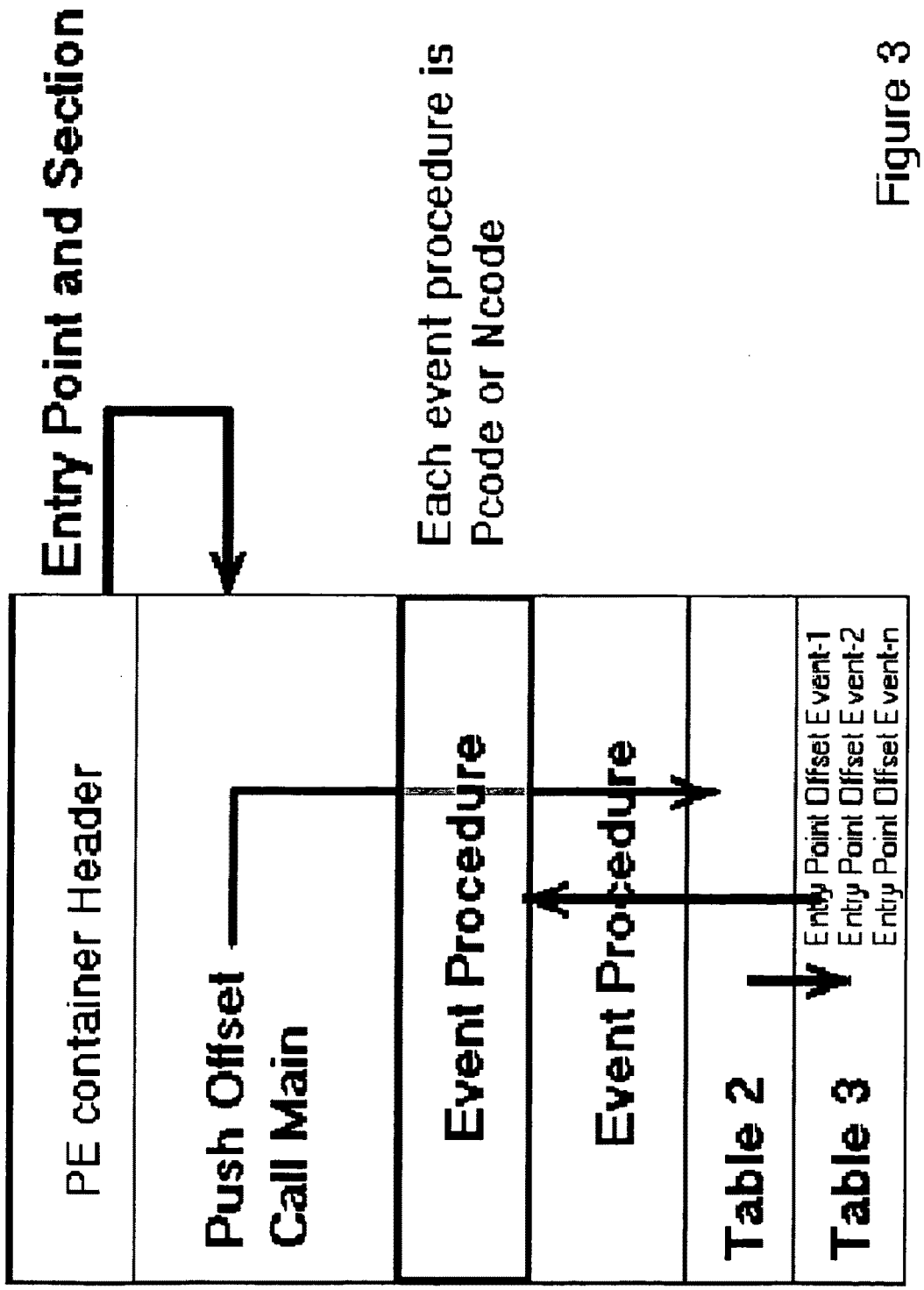
FIG. 3 schematically illustrates aspects of the P-code contained within a typical application program.

FIG. 3 provides a more detailed illustration of the P-code file structure within a PE or COFF file 'container' of the program structure within the virtual memory 18 of FIG. 2. FIG. 3 also illustrates an exemplary flow within a P-code program. The PE header provides the entry point to the program and a push to the table offset defined in the P-code header. There is then a call to ThunMain of the AVPE, which starts navigating the tables to find the event procedures, which precede the tables in the memory.

Figure 4:
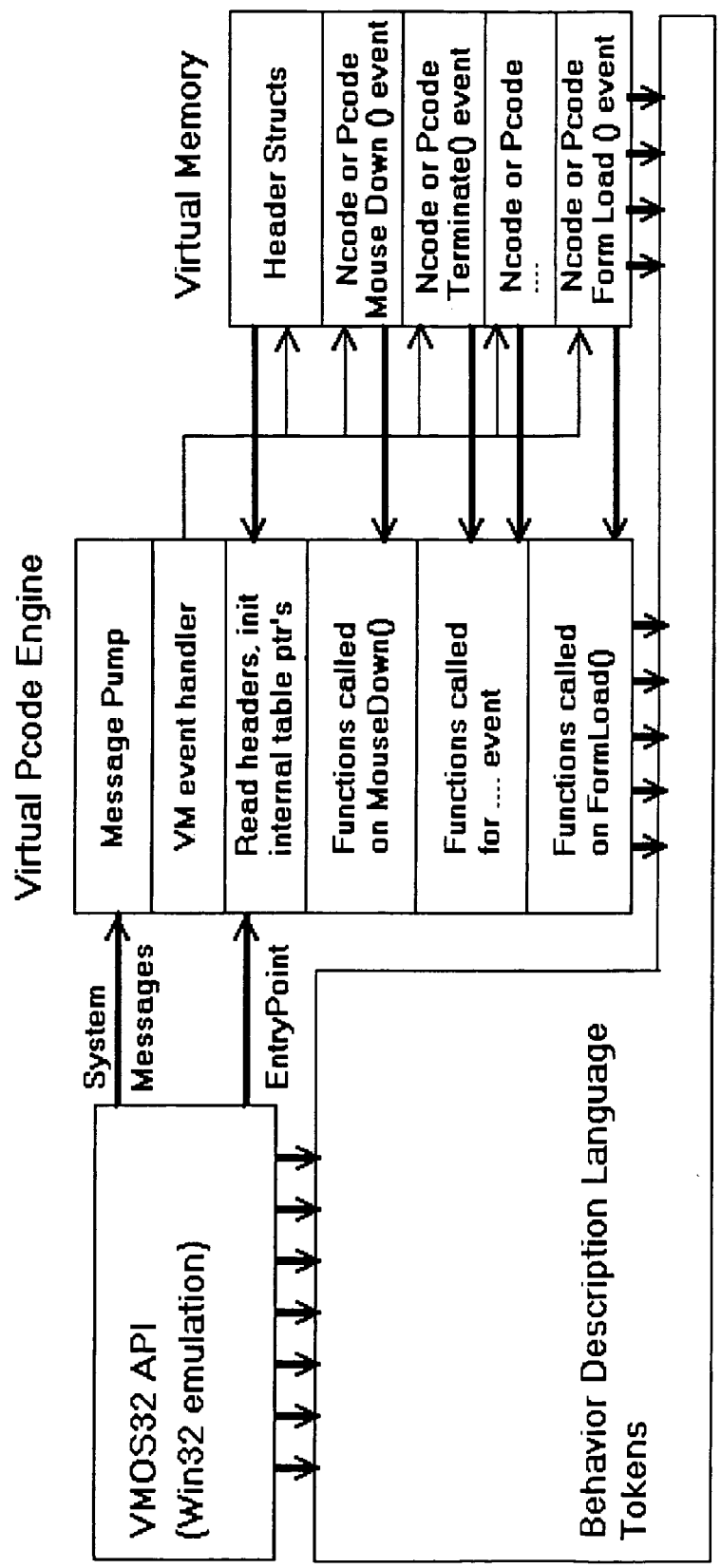
FIG. 4 illustrates an interface of an analytical virtual P-code engine (AVPE) to various program file formats including Visual Basic (VB) P-code and VB-native (N-code).

FIG. 4 illustrates how visual basic (VB) P-code and VB-native (N-code) file formats interface with the preferred virtual PC in accordance with certain embodiments of the present invention. After the file format has been evaluated and the tables have been interpreted the entry point-file offsets for each event procedure are calculated. The file is opened and the AVM reads the relevant code into virtual memory as a data stream. The length of the code of each event procedure is calculated from fields in the tables that were earlier read from the file. This information is passed to the virtual program loader. The virtual program loader uses information in the file header to load the extracted code at the correct simulated offset in a virtual memory array. The message pump that is present in most Win32 program is, in the case of P-code or N-code programs, located in the AVPE. The message pump is sequentially triggered with system messages, decoded in the VM event handler and derived from the tables imported earlier from the file, in a manner that assures that each event procedure is called at least once. As each event procedure in a P-code program is triggered, the AVPE retrieves the P-code from the entry point of each event procedure, decodes that P-code and virtually performs the associated processing. N-code programs are executed by the virtual central processing unit and call application program interface (API) library functions within the AVPE. P-code AVPE functions are closely associated with the same functions compiled to N-code.

Throughout the operation of the FIG. 4 P-code engine, data in the form of behavior description language tokens are exchanged with the Tbehavior class defined within the Tstruct class for recording the behavior of the P-code program as it is executed. Thus, all of the illustrated actions of the P-code engine are recorded within the Tstruct and that Tstruct class is stored so that it survives after the instance of the AVPE and the corresponding P-code or other program is terminated.

A memory mapping utility maps the virtual memory map to the offset for the file type that is virtualized. The loader utility dynamically assigns physical memory to the virtual computer memory array each time a program is virtualized, and proceeds to build a new AVPE. Each AVPE contains a filled environment string area. Each virtualized program runs in a fresh memory area, created when that program is loaded into the virtual PC. Previous instances, where infected programs may have been virtualized, therefore cannot affect the performance of subsequent programs. An exception to this rule is where the program is spawned from a previous instance of a program, for instance where a program creates or drops another program that was contained within the body of the first program. In the cased of spawned programs, the memory resources are shared, as are the virtual file system and the operating system data areas and registry. At the end of the virtualization process, the AVPE is shut down and its memory resources are released (deallocated) and the AVPE completes assembly of the behavior pattern for the target program.

Figure 5:
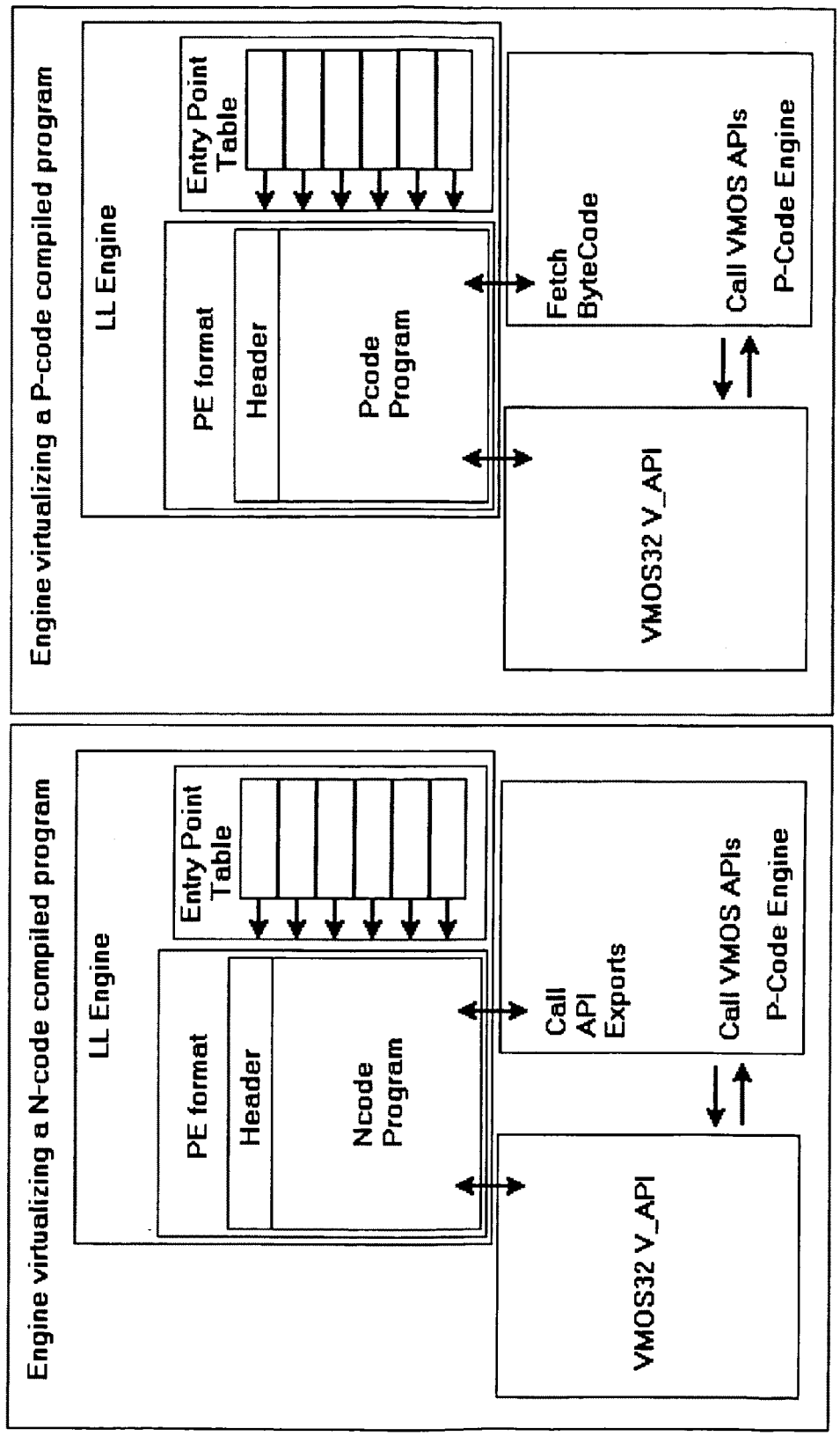
FIG. 5 schematically illustrates the virtual PC memory map after loading a compiled P-code program and after loading an N-code executable program.

FIG. 5 illustrates how the virtual memory is configured for both P-code and N-code programs. The memory map and mapper utility are adjusted depending on the file type. FIG. 5 schematically illustrates the virtual PC memory map after loading a compiled P-code program and after loading a N-code executable program. To virtualize the code in the desired manner, the structure of the virtual PC and its memory map contains the same information as it would if the code was executed on the physical P-code engine that exists within the PC that runs a P-code Virtual Machine.

The program loader simulates the loader functions of the operating system and creates system areas that represent similar system areas in the physical computer. This is particularly advantageous functionality because the code under evaluation most preferably runs in the same manner as if executed on a physical computer system. The program headers follow the PE headers, which contain the entry point of the program. At that entry point a value is pushed onto the stack, followed by a call to the P-code engine initialization routine usually called 'main' or 'ThunRTmain'. The value pushed onto the stack represents the point at which the AVPE starts interpreting the header tables. Depending on the content of these tables the event procedures that follow the tables are either compiled to P-code or N-code. In the case of N-code, the virtualized program is executed by fetching instructions from the virtual memory array into a pre-fetch instruction queue. The instructions in the queue are decoded and their length is determined by their operational parameters.

The instruction pointer is incremented accordingly so that the instruction loader is ready to fetch the next instruction. The virtual low level (LL) engine determines from the r/m field of the instruction parameters where to fetch the data on which the instruction operates. The data fetch mechanism fetches this data and presents the data to the logic unit, which then performs the operation indicated by the code. The destination of the processed data is determined from the parameters of the instruction code. The data write mechanism is used to write the processed data to emulated memory or the emulated processor register set. This process accurately reflects what takes place in a physical CPU (central processing unit). Where the virtual CPU encounters an API call to the P-code virtual machine, a call to the AVPE API is substituted.

Figure 6A:
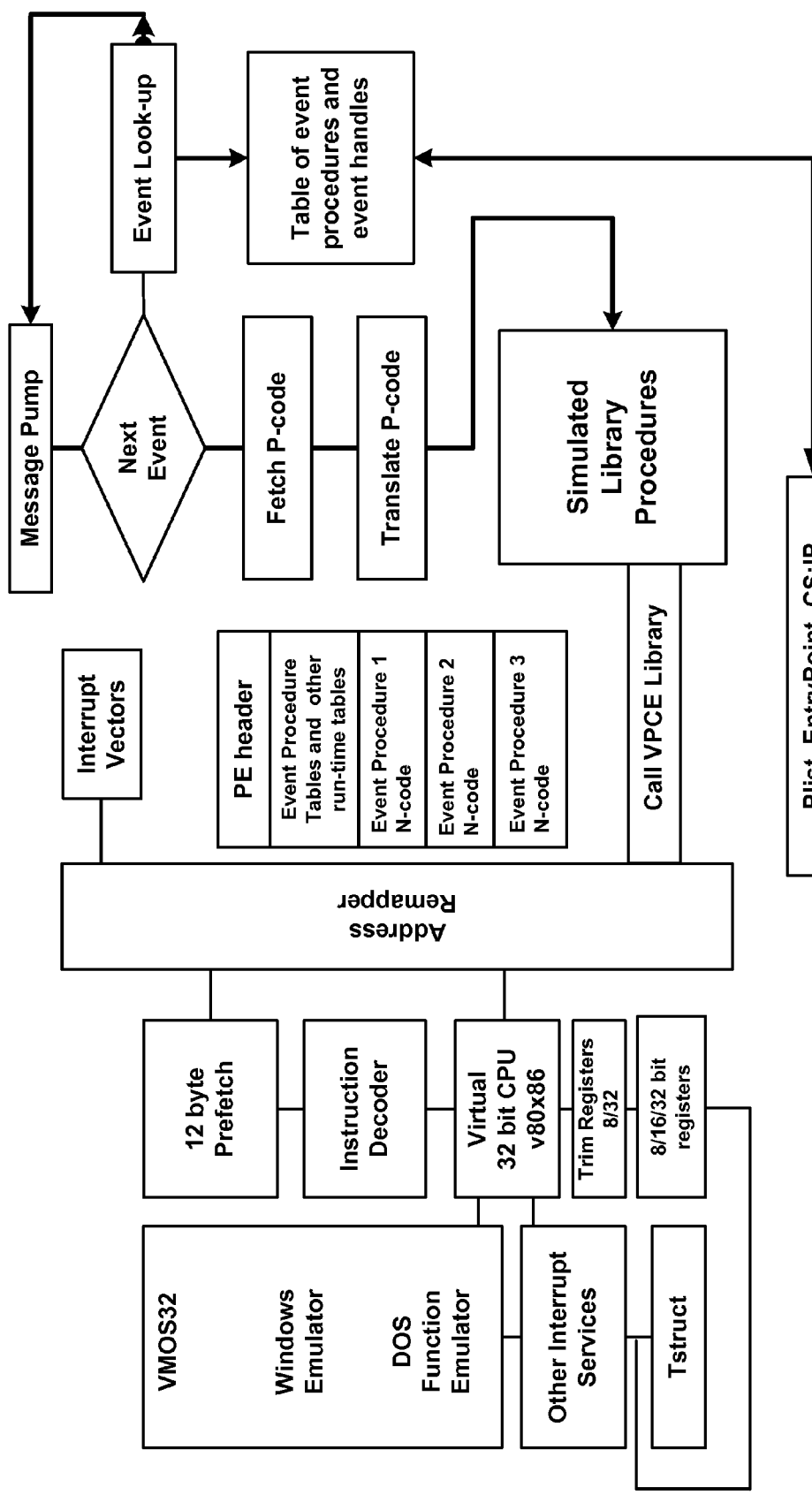
FIGS. 6a and 6b show components of a preferred implementation of an analytical virtual P-code engine (AVPE).
Figure 6B:
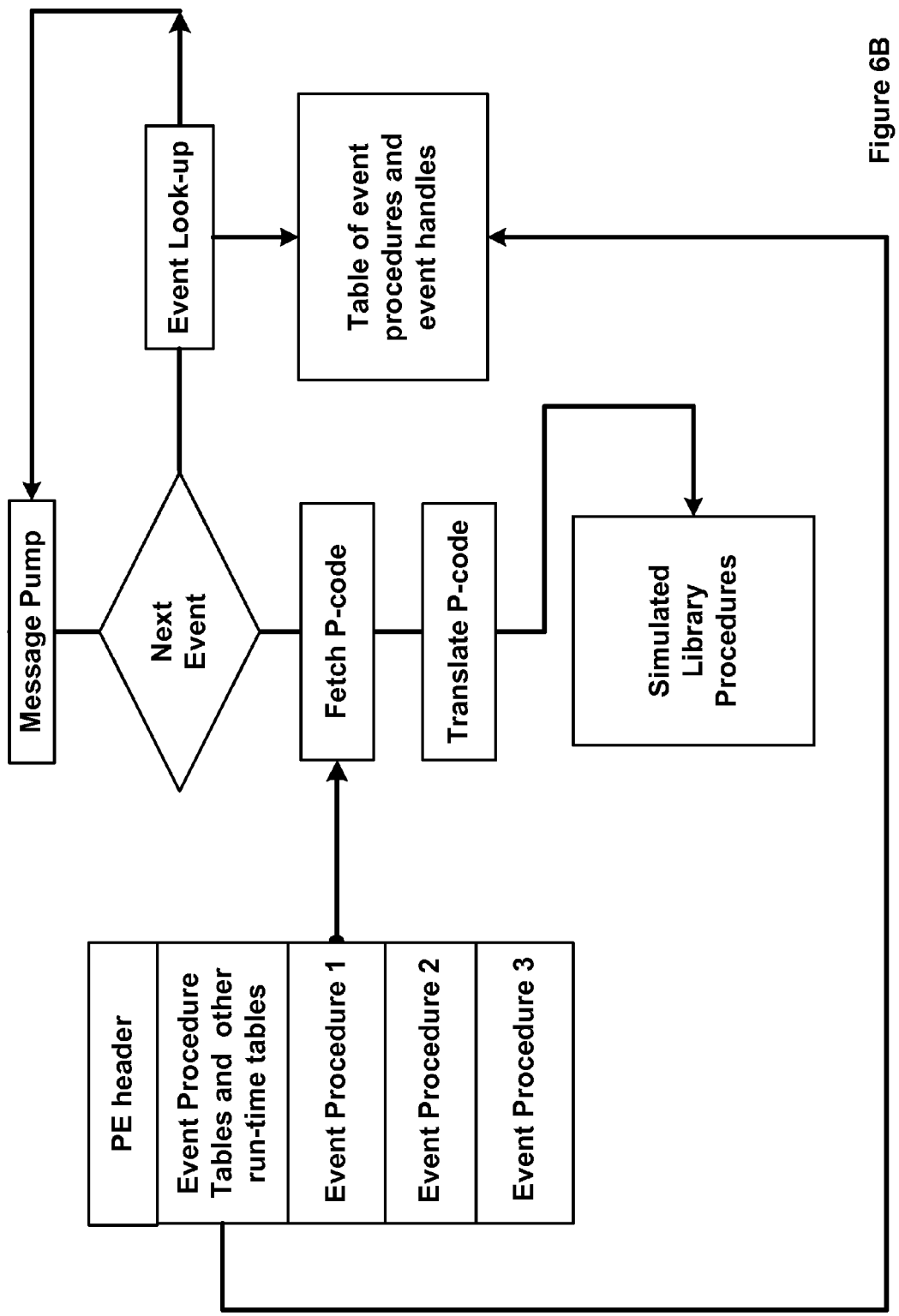

FIGS. 6a and 6b illustrate components of a preferred implementation of an analytical virtual P-code engine (AVPE) and the interaction of the AVPE within the AVM and components of the AVM. The AVPE contains the same components as are used in a physical computer, except that all components are simulated in software running an (AVM) analytical virtual machine on a physical computer. The event procedure table is extracted from the P-code or N-code compiled program tables. The entry point of these tables is pushed onto a stack at the entry point of the program, which is pointed at by the CS:IP value located in the PE header of the program file. The table is populated and the message pump is started, sequentially triggering each event procedure. In the case that the program is compiled to P-code, the P-code engine executes each event procedure by fetching each sub sequential P-code from the event procedure at the incremented offset defined in the event procedure table. The P-code is translated and processed by calling the appropriate library routines within the P-code engine. In the case of a program compiled to N-code, the library routines are called directly by the simulated central processing unit located in an analytical virtual machine. Analytical virtual machines (AVM) are described in U.S. patent application Ser. No. 09/885,427, filed on Jun. 19, 2001 and entitled "Analytical Virtual Machine," which application is hereby incorporated by reference in its entirety.

All areas of this process are simulated, as generally illustrated in FIG. 6a or 6b. The memory exists as an array of elements into which all memory accesses are mapped by a memory mapping mechanism. The size of the memory array may be adjusted to accommodate the size of the expected target programs, depending on the requirements of the system. The library routines contained within the AVPE are available as API's (application program interfaces) in the same way as the operating system API's function in the simulated operating system VMOS. The VMOS operating system is implemented as a virtual API (VAPI) that simulates the results returned by operating system API's.

During the virtualization process, flags are set in the behavior pattern (Tstruct) field as the functions represented by program instructions and/or API calls are virtualized. The sequence in which these functions are called is recorded in the sequencer. The behavior pattern therefore matches closely the behavior of the program under evaluation to the behavior of that program in a physical PC environment.

In case of programs compiled to P-code, the AVPE is initialized from within the virtual machine to fetch P-codes and interpret the P-codes. The AVPE then calls the appropriate library routines as API's to execute the function. The processing of subsequent instructions is very similar to the processing of N-code as described above, except that the P-code engine performs the fetching of P-codes from the virtual machine virtual memory array and performs the interpretation of those P-codes.

Encrypted viruses are no problem, because the execution of the code within the virtual machine effectively decrypts any encrypted, packed or polymorphic virus, as it would in a physical PC environment. These decryption and unpacking actions preferably take place before the P-code engine is initiated, since the virtual machine only finds out the nature of the embedded executable after unpacking or decryption. Because all parts of the virtual computer are virtualized in preferred embodiments, and at no time is the virtualized program allowed to interact with the physical computer, the viral code should not escape from the AVPE and infect the physical computer.

Figure 7:
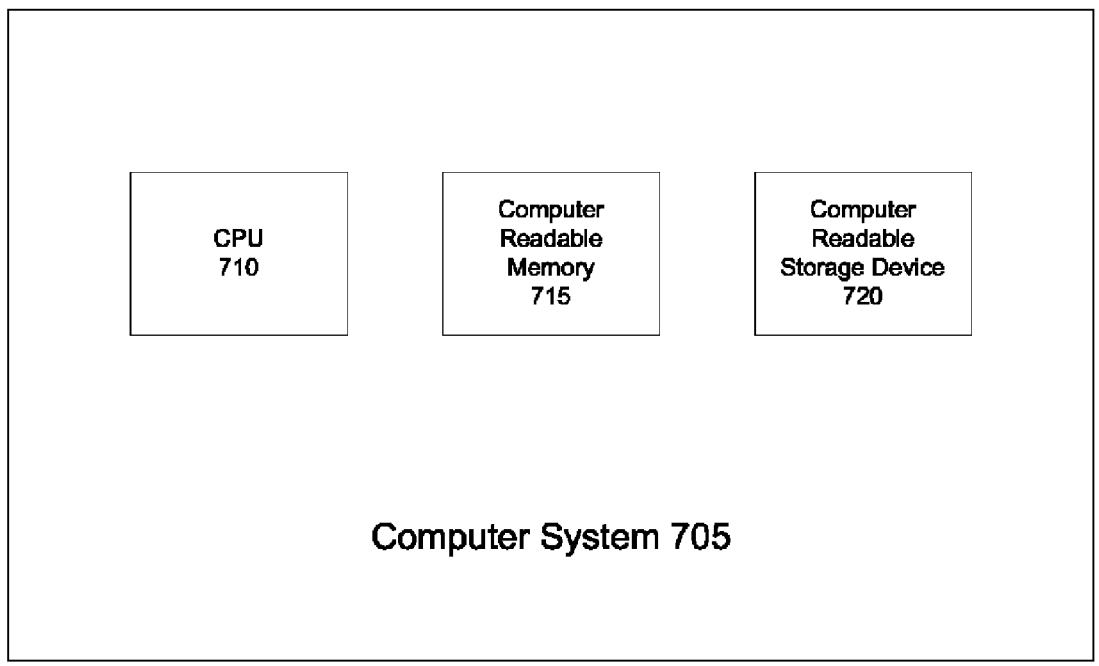
FIG. 7 illustrates a computer system, in accordance with certain exemplary embodiments.

FIG. 7 illustrates aspects of an exemplary computing environment in which an embodiment of the invention is designed to operate. For example, exemplary computing system 705 can comprise software modules performing the processes described herein, such as the processes of a virtual machine. The software modules can be stored in exemplary computer-readable storage device 720 and be executed by exemplary CPU 710 via exemplary computer-readable memory 715. Computing device 705, computer-readable storage device 720, CPU 710, and computer-readable memory 715 are conventional computing components well known to those of ordinary skill in the art. Other embodiments of the invention may operate in other types of computing environments. In certain exemplary embodiments, the AVPE described herein is stored in the computer-readable storage device 720 for execution by the CPU 710 via the computer-readable memory 715.

The present invention has been described here with respect to certain preferred embodiments thereof. Those of ordinary skill will appreciate that various modifications and alternate embodiments of the invention might be practiced without varying from the basic teachings of the present invention. As such, the present invention is not to be limited to the particular embodiments described here. Rather, the scope of the present invention is to be determined from the claims.

I claim:

1. A method for identifying presence of malicious code in a target program within a computer system, the method comprising:

the computer system virtually executing the target program within a virtual computer so that the target program interacts with the computer system through the virtual computer, the virtual computer comprising (a) software simulating functionality of a central processing unit, an operating system, input/output ports and memory and (b) software simulating functionality of an interpreter and library routines exposed as program interfaces for virtual execution of the target program;

the computer system (a) tracking functions performed by the target program during virtual execution, a sequence in which the functions are performed, and information associated with the functions performed by the target program during virtual execution and (b) identifying other functions from a predetermined set that normally accompany the performed functions but are not performed by the target program during virtual execution of the target program; and the computer system determining a of malicious function associated with the target program based upon the tracked functions, the sequence in which the functions are performed, the information associated with the functions performed, and the identified other functions.

2. The method of claim 1, further comprising the computer system removing a copy of the target program that was contained within the virtual computer.

3. The method of claim 1, further comprising the computer system terminating the virtual computer after the determination, wherein terminating the virtual computer includes deallocating of all resources of a virtual memory implemented by the software simulating functionality of the memory.

4. The method of claim 1, further comprising the computer system deallocating all resources of a virtual memory containing data or program statements created by virtual execution of the target program, the virtual memory implemented by the software simulating functionality of the memory.

5. The method of claim 1, wherein the library routines for the target program are exposed to the virtual computer through one of the programming interfaces.

6. The method of claim 1, wherein a compiled version of the target program comprises a native code compiled program.

7. The method of claim 1, wherein the virtual computer is capable of executing pseudo code.

8. The method of claim 1, wherein the virtual computer simulates functionality of data areas for the operating system and programming interfaces for the operating system.

9. The method of claim 1, wherein the virtual computer further comprises software for simulating the functionality of BIOS firmware and language emulators.

10. The method of claim 1, wherein virtual execution of the target program causes the target program to interact with the operating system program interface simulated by the virtual computer.

11. The method of claim 1, wherein after a first instance of the target program is executed by the virtual computer, the computer system storing flags corresponding to the first instance in a database within the computer system.

12. A method for identifying presence of malicious code in a target program within a computer system, the method comprising:

the computer system virtually executing the target program with a virtual computer implemented by software and comprising a virtual central processing unit simulating functionality of a central processing unit, virtual memory simulating the functionality of memory, and a virtual operating system simulating functionality of an operating system including program interface calls, the target program interacting with an instance of the virtual operating system during virtual execution, whereby any malicious code is fully executed during virtual execution of the target program if the target program is infected by the malicious code; and the computer system generating (a) tracking function performed by the target program during virtual execution, a sequence in which the functions are performed, and information associated with the functions performed by the target program during virtual execution and (b) identifying other functions from a predetermined set that normally accompany the performed functions but are not performed by the target program during virtual execution of the target program.

13. The method of claim 12, further comprising the computer system storing a record of the tracked functions, the sequence, information associated with the functions performed by the target program, and the identified other functions behavior pattern in memory that is representative of operations of the target program with the computer system, including operations of the malicious code by the virtual computer if the target program comprises the malicious code.

14. The method of claim 13, further comprising the computer system matching the record to a plurality of predefined behavior patterns, each representative of a single malicious code function.

15. The method of claim 12, wherein after a first instance of the target program is executed by the virtual computer, the computer system storing a record of the tracked functions, the sequence, the information associated with the functions performed by the target program, and the identified other functions corresponding to the first instance in a database within the computer system.

16. The method of claim 13, further comprising the computer system generating a new record each time the target program is modified.

17. A computer program product for identifying presence of malicious code in a target program within a computer system, the computer program product comprising:

a computer-readable storage device(s);

first program instructions to virtually execute the target program within a virtual computer so that the target program interacts with the computer system through the virtual computer, the virtual computer simulating functionality of a computer code interpreter, the virtual computer comprising a virtual central processing unit, a virtual operating system, and a virtual memory;

second program instructions to generate a behavior pattern for the target program which includes flags for tracking track functions performed by the target program during virtual execution, a sequence in which the functions are performed, and information associated with the functions performed by the target program during virtual execution and (b) identifying other functions from a predetermined set that normally accompany the performed functions but are not performed by the target program during virtual execution of the target program, the flags forming a behavior pattern field that tracks a sequence in which the functions are called by the target program, the behavior pattern representing information about all functions simulated by the target program during virtual execution; and third program instructions to determine a malicious function associated with the target program based upon the tracked functions, the sequence in which the functions are performed, the information associated with the functions performed, and the identified other functions, wherein the first, second, and third program instructions are stored on the computer-readable storage device(s).

18. The computer program product of claim 17, further comprising fourth program instructions to terminate the virtual computer by deallocating all virtual memory resources.

19. The computer program product of claim 17, further comprising fourth program instructions to cause the computer system to run the virtual computer which executes machine code of the target program.

20. A computer system for identifying presence of malicious code in a target program within the computer system, the computer system comprising:

a CPU, a computer-readable memory, and a computer-readable storage device(s); first program instructions to virtually execute the target program within a virtual computer so that the target program interacts with the computer system through the virtual 1 computer, the virtual computer comprising (a) software simulating functionality of a central processing unit, an operating system, input/output ports and memory and (b) software simulating functionality of an interpreter and library routines exposed as program interfaces for virtual execution of the target program; second program instructions to (a) track functions performed by the target program during virtual execution, a sequence in which the functions are performed, and information associated with the functions performed by the target program during virtual execution and (b) identify other functions from a predetermined set that normally accompany the performed functions but are not performed by the target program during virtual execution of the target program; and third program instructions to determine a malicious function associated with the target program based upon the tracked functions, the sequence in which the functions are performed, the information associated with the functions performed, and the other identified functions, wherein the first, second, and third program instructions are stored on the computer-readable storage device(s) for execution by the CPU via the computer-readable memory.

21. The computer system of claim 20, further comprising fourth program instructions to remove a copy of the target program that was contained within the virtual computer.

22. The computer system of claim 20, further comprising fourth program instructions to terminate the virtual computer after the determination, wherein terminating the virtual computer comprises deallocating of all resources of a virtual memory implemented by the software simulating functionality of the memory.

23. The computer system of claim 20, wherein the virtual computer simulates functionality of data areas for the operating system and programming interfaces for the operating system.

24. The method of claim 1, wherein the computer system determining a malicious function comprises matching a record of the tracked functions, the sequence, information associated with the functions performed by the target program, and the identified other functions to a plurality of predefined behavior patterns, each representative of a single malicious code function.

25. The method of claim 1, wherein the computer system determining a malicious function comprises determining whether the tracked functions, the sequence, and the information associated with the functions performed by the target program indicate at least one of: (a) insertion of code into an executable file, (b) insertion of code into a document, (c) submitting code to an application for transmission, (d) submitting code to an application for storage, (e) insertion of code into memory blocks, and (e) modification of memory control blocks.

* * * * *